(12) United States Patent
Smith

(10) Patent No.: US 9,352,790 B2
(45) Date of Patent: May 31, 2016

(54) VEHICLE BED EXTENDER

(71) Applicant: Lund Motion Products, Inc., Dallas, TX (US)

(72) Inventor: Anthony Smith, Costa Mesa, CA (US)

(73) Assignee: Lund Motion Products, Inc., Buford, GA (US)

( * ) Notice: Subject to any disclaimer, the term of this patent is extended or adjusted under 35 U.S.C. 154(b) by 0 days.

(21) Appl. No.: 14/278,553

(22) Filed: May 15, 2014

(65) Prior Publication Data

US 2015/0008694 A1 Jan. 8, 2015

Related U.S. Application Data

(63) Continuation of application No. 13/285,838, filed on Oct. 31, 2011, now Pat. No. 8,727,415.

(60) Provisional application No. 61/503,544, filed on Jun. 30, 2011.

(51) Int. Cl.
*B62D 33/023* (2006.01)
*B62D 33/027* (2006.01)

(52) U.S. Cl.
CPC .......... *B62D 33/023* (2013.01); *B62D 33/0273* (2013.01); *Y10T 29/49826* (2015.01)

(58) Field of Classification Search
CPC .................. B62D 33/0273; B62D 33/023
USPC ............................................. 296/26.08, 26.11
See application file for complete search history.

(56) References Cited

U.S. PATENT DOCUMENTS

| 171,736 | A | 1/1876 | Mooney |
| 341,307 | A | 5/1886 | Altschwager |
| 600,898 | A | 3/1898 | Smith |
| 1,242,035 | A | 10/1917 | Pierson et al. |
| 1,266,521 | A | 5/1918 | Norquist |
| 1,272,620 | A | 7/1918 | Carlson |
| 1,289,997 | A | 12/1918 | Wyeth |
| 1,655,777 | A | 1/1928 | Weiland |
| 1,655,797 | A | 1/1928 | Peck |
| 1,764,615 | A | 6/1930 | Edwards |
| 1,812,580 | A | 6/1931 | Black |

(Continued)

FOREIGN PATENT DOCUMENTS

SU 0629098 9/1978

OTHER PUBLICATIONS

PCT/US2012/044443—PCT International Patent Application filed Jun. 27, 2012—Written Opinion of the International Searching Authority.

*Primary Examiner* — Dennis H Pedder
(74) *Attorney, Agent, or Firm* — Knobbe Martens Olson and Bear LLP

(57) ABSTRACT

A vehicle bed extender adapted for simultaneous adjustment of both length and width. The extender includes a first side wall, a second side wall, and a connecting wall. The first and second side walls can attach to the vehicle storage bed, while the connecting wall attaches to the side walls in a sliding configuration along a direction nonparallel to the length and width of the bed extender. The connecting wall can also be composed of multiple cross members with middle portions of varying length such that the middle portions of the cross members are not vertically oriented. The vehicle bed extender can also be supported by a mount at the front end of the vehicle bed that supports the connecting wall.

13 Claims, 21 Drawing Sheets

(56) References Cited

U.S. PATENT DOCUMENTS

| | | | |
|---|---|---|---|
| 2,514,466 A | 7/1950 | Bildhauer | |
| D160,213 S | 9/1950 | Samuelson | |
| 2,621,357 A | 12/1952 | Stuman | |
| 2,626,179 A | 1/1953 | Gonzalez | |
| RE23,814 E | 4/1954 | Ingram | |
| 2,713,897 A | 7/1955 | Teague et al. | |
| 2,720,414 A | 10/1955 | Hart | |
| 2,795,363 A | 6/1957 | Turner | |
| 2,797,959 A | 7/1957 | Brice | |
| 2,872,239 A | 2/1959 | Bowness et al. | |
| 2,874,885 A | 2/1959 | Young | |
| 3,329,385 A | 7/1967 | Dietsch | |
| 3,357,670 A | 12/1967 | Larson | |
| 3,656,801 A | 4/1972 | Doutt et al. | |
| 3,734,560 A | 5/1973 | Cramblet | |
| 3,902,599 A | 9/1975 | Stromberg | |
| 4,023,850 A | 5/1977 | Tillery | |
| 4,063,774 A | 12/1977 | Hanks | |
| 4,132,335 A | 1/1979 | Ingram | |
| 4,136,905 A | 1/1979 | Morgan | |
| 4,295,587 A | 10/1981 | Bott | |
| D266,836 S | 11/1982 | Ingram | |
| D267,247 S | 12/1982 | Kowalski et al. | |
| 4,419,794 A | 12/1983 | Horton, Jr. et al. | |
| 4,451,075 A | 5/1984 | Canfield | |
| 4,470,716 A | 9/1984 | Welch | |
| 4,472,639 A | 9/1984 | Bianchi | |
| 4,531,773 A | 7/1985 | Smith | |
| 4,585,263 A | 4/1986 | Hesner | |
| 4,596,417 A | 6/1986 | Bennett | |
| 4,635,992 A | 1/1987 | Hamilton et al. | |
| 4,650,144 A | 3/1987 | Conrad | |
| 4,652,035 A | 3/1987 | Austin, Jr. | |
| 4,659,136 A | 4/1987 | Martin et al. | |
| D291,789 S | 9/1987 | Noga | |
| D294,137 S | 2/1988 | Robson | |
| 4,749,226 A | 6/1988 | Heft | |
| 4,750,773 A | 6/1988 | Chapline et al. | |
| 4,770,458 A | 9/1988 | Burke et al. | |
| 4,778,213 A | 10/1988 | Palmer | |
| 4,786,119 A | 11/1988 | Smuda | |
| D300,734 S | 4/1989 | Kruitbosch | |
| 4,824,158 A | 4/1989 | Peters et al. | |
| 4,828,312 A | 5/1989 | Kinkel et al. | |
| 4,830,242 A | 5/1989 | Painter | |
| 4,875,724 A | 10/1989 | Gruber | |
| D305,111 S | 12/1989 | Zagner | |
| 5,005,892 A | 4/1991 | Haugen et al. | |
| 5,024,409 A | 6/1991 | Bohnen | |
| 5,037,152 A | 8/1991 | Hendricks | |
| 5,037,153 A | 8/1991 | Stark | |
| D321,496 S | 11/1991 | Sparham et al. | |
| 5,083,829 A | 1/1992 | Fonseca | |
| D326,076 S | 5/1992 | Wiese | |
| 5,114,203 A | 5/1992 | Carnes | |
| 5,123,691 A | 6/1992 | Ginn | |
| 5,127,697 A | 7/1992 | St. Marie | |
| 5,129,665 A | 7/1992 | Sutter et al. | |
| 5,147,103 A | 9/1992 | Ducote | |
| 5,154,470 A | 10/1992 | Bringman, Jr. | |
| 5,169,200 A | 12/1992 | Pugh | |
| 5,170,746 A | 12/1992 | Roose | |
| 5,201,532 A | 4/1993 | Salesky et al. | |
| 5,201,562 A | 4/1993 | Dorsey | |
| 5,253,913 A | 10/1993 | Metivier | |
| 5,299,773 A | 4/1994 | Bertrand | |
| 5,310,155 A | 5/1994 | Wu | |
| 5,396,915 A | 3/1995 | Bomar | |
| D360,614 S | 7/1995 | Alcocer | |
| 5,441,324 A | 8/1995 | Gold | |
| 5,456,511 A | 10/1995 | Webber | |
| 5,468,038 A | 11/1995 | Sauri | |
| D365,323 S | 12/1995 | Napierkowski et al. | |
| 5,588,630 A | 12/1996 | Chen-Chao | |
| 5,622,296 A | 4/1997 | Pirhonen et al. | |
| 5,658,033 A | 8/1997 | Delaune | |
| 5,685,686 A | 11/1997 | Burns | |
| 5,700,047 A | 12/1997 | Leitner et al. | |
| 5,730,342 A | 3/1998 | Tien | |
| 5,743,589 A | 4/1998 | Felker | |
| D394,639 S | 5/1998 | Carter | |
| 5,752,800 A | 5/1998 | Brincks et al. | |
| 5,755,480 A | 5/1998 | Bryan | |
| 5,765,892 A | 6/1998 | Covington | |
| 5,775,759 A | 7/1998 | Cummins | |
| 5,788,311 A | 8/1998 | Tibbals | |
| D398,284 S | 9/1998 | Carter et al. | |
| 5,806,907 A | 9/1998 | Martinus et al. | |
| D399,481 S | 10/1998 | Larson et al. | |
| 5,816,637 A | 10/1998 | Adams et al. | |
| 5,820,188 A | 10/1998 | Nash | |
| 5,823,596 A | 10/1998 | Kulesza | |
| 5,839,614 A | 11/1998 | Brown | |
| 5,853,116 A | 12/1998 | Schreiner | |
| 5,857,724 A | 1/1999 | Jarman | |
| 5,862,964 A | 1/1999 | Moliner | |
| D410,429 S | 6/1999 | Derecktor | |
| 5,911,464 A | 6/1999 | White | |
| 5,924,614 A | 7/1999 | Kuntze et al. | |
| 5,924,753 A | 7/1999 | DiBassie | |
| D417,859 S | 12/1999 | Leitner et al. | |
| D418,106 S | 12/1999 | Leitner et al. | |
| 5,997,066 A | 12/1999 | Scott | |
| 6,019,410 A | 2/2000 | Trostle et al. | |
| 6,082,801 A | 7/2000 | Owen et al. | |
| 6,102,265 A | 8/2000 | Stapleton | |
| 6,112,964 A | 9/2000 | Cucheran et al. | |
| 6,113,173 A | 9/2000 | Leitner et al. | |
| 6,120,076 A | 9/2000 | Adsit et al. | |
| 6,123,305 A | 9/2000 | Lukasavitz | |
| 6,149,219 A | 11/2000 | Schambre et al. | |
| 6,227,593 B1 | 5/2001 | De Valcourt | |
| 6,257,637 B1 | 7/2001 | Reed | |
| 6,269,990 B1 | 8/2001 | Gray | |
| 6,283,525 B1 | 9/2001 | Morse | |
| 6,338,515 B1 | 1/2002 | Munhall | |
| 6,340,190 B1 | 1/2002 | Rosebrugh et al. | |
| 6,378,926 B1 | 4/2002 | Renze et al. | |
| 6,390,427 B1 | 5/2002 | McConnell et al. | |
| 6,402,215 B1 | 6/2002 | Leitner et al. | |
| 6,422,627 B1 | 7/2002 | Kuhn et al. | |
| 6,425,618 B1 | 7/2002 | Garland et al. | |
| 6,454,338 B1 | 9/2002 | Glickman et al. | |
| 6,471,277 B1 | 10/2002 | Scensny et al. | |
| 6,494,520 B2 | 12/2002 | Brzenchek et al. | |
| 6,513,688 B2 | 2/2003 | Kmita et al. | |
| 6,540,123 B1 | 4/2003 | Kmita et al. | |
| 6,550,841 B1 | 4/2003 | Burdon et al. | |
| 6,557,918 B2 | 5/2003 | Iafrate et al. | |
| 6,561,560 B2 | 5/2003 | Brown et al. | |
| 6,598,922 B2 | 7/2003 | Morse et al. | |
| 6,607,228 B2 | 8/2003 | Carter, III et al. | |
| 6,626,478 B1 | 9/2003 | Minton | |
| 6,637,707 B1 * | 10/2003 | Gates et al. | 248/224.7 |
| 6,676,182 B2 | 1/2004 | Fitts | |
| 6,719,261 B2 | 4/2004 | Wadsworth | |
| 6,719,345 B2 | 4/2004 | Ootsuka et al. | |
| 6,752,575 B1 | 6/2004 | Moore et al. | |
| 6,796,471 B2 | 9/2004 | Aftanas et al. | |
| 6,805,392 B2 | 10/2004 | Leitner et al. | |
| 6,889,878 B2 | 5/2005 | Parsons | |
| 6,918,624 B2 | 7/2005 | Miller et al. | |
| 6,923,488 B2 | 8/2005 | Bruford et al. | |
| 6,948,763 B2 | 9/2005 | Robbins | |
| 6,966,595 B2 | 11/2005 | Bruford et al. | |
| 6,983,972 B2 | 1/2006 | Tan et al. | |
| 6,994,389 B2 | 2/2006 | Graffy et al. | |
| 7,007,995 B1 | 3/2006 | Scarberry et al. | |
| 7,063,366 B2 | 6/2006 | Leitner et al. | |
| 7,093,870 B2 | 8/2006 | Kim et al. | |
| 7,100,956 B1 | 9/2006 | Wilkins | |
| 7,111,886 B1 | 9/2006 | Miller et al. | |
| 7,121,604 B2 | 10/2006 | Reed | |
| 7,152,902 B2 | 12/2006 | Moen et al. | |

(56) References Cited

U.S. PATENT DOCUMENTS

| | | | |
|---|---|---|---|
| 7,159,918 B2 | 1/2007 | Lussier | |
| 7,175,218 B1 | 2/2007 | Keene | |
| 7,182,380 B2 | 2/2007 | Nagle | |
| 7,195,432 B2 | 3/2007 | Earle et al. | |
| D544,826 S | 6/2007 | Smith | |
| 7,226,100 B1 | 6/2007 | Willey et al. | |
| 7,229,116 B1 | 6/2007 | Bruford et al. | |
| 7,240,940 B2 * | 7/2007 | Leitner | 296/26.11 |
| 7,267,387 B1 | 9/2007 | Bruford et al. | |
| D553,072 S | 10/2007 | Smith | |
| 7,303,222 B2 | 12/2007 | Wilkins | |
| 7,347,473 B2 | 3/2008 | Miller et al. | |
| D568,230 S | 5/2008 | Smith | |
| 7,393,035 B2 | 7/2008 | Leitner et al. | |
| 7,413,231 B1 | 8/2008 | Wood et al. | |
| 7,464,976 B2 | 12/2008 | Smith | |
| 7,488,021 B1 | 2/2009 | Roos et al. | |
| 7,547,054 B2 | 6/2009 | Leitner | |
| D597,924 S | 8/2009 | Smith | |
| 7,654,598 B2 | 2/2010 | Leitner et al. | |
| 7,654,599 B2 | 2/2010 | Stewart et al. | |
| 7,681,935 B2 | 3/2010 | Leitner et al. | |
| D627,703 S | 11/2010 | McLaughlin | |
| 7,841,638 B2 | 11/2010 | Smith | |
| 7,857,371 B2 | 12/2010 | Leitner | |
| 7,878,568 B2 | 2/2011 | Wu | |
| 7,905,539 B2 | 3/2011 | De Carli | |
| 7,959,203 B2 | 6/2011 | Smith | |
| 8,020,737 B2 | 9/2011 | Sweeney | |
| 8,020,912 B2 | 9/2011 | Lounds | |
| 2002/0000732 A1 | 1/2002 | Sanders | |
| 2002/0096901 A1 | 7/2002 | Lafrate et al. | |
| 2003/0116986 A1 * | 6/2003 | Ootsuka et al. | 296/26.08 |
| 2004/0080174 A1 | 4/2004 | Buelna | |
| 2004/0134953 A1 | 7/2004 | Perez | |
| 2005/0077747 A1 | 4/2005 | De Gaillard et al. | |
| 2006/0091170 A1 | 5/2006 | Almhil | |
| 2006/0091171 A1 | 5/2006 | Wardell et al. | |
| 2006/0283900 A1 | 12/2006 | Stapleton | |
| 2007/0170739 A1 | 7/2007 | Sims | |
| 2007/0262602 A1 | 11/2007 | Nagle | |
| 2008/0111390 A1 | 5/2008 | Smith | |
| 2009/0020576 A1 | 1/2009 | Gale | |
| 2009/0108612 A1 | 4/2009 | Smith | |
| 2010/0283280 A1 | 11/2010 | Kohlstrand et al. | |

* cited by examiner

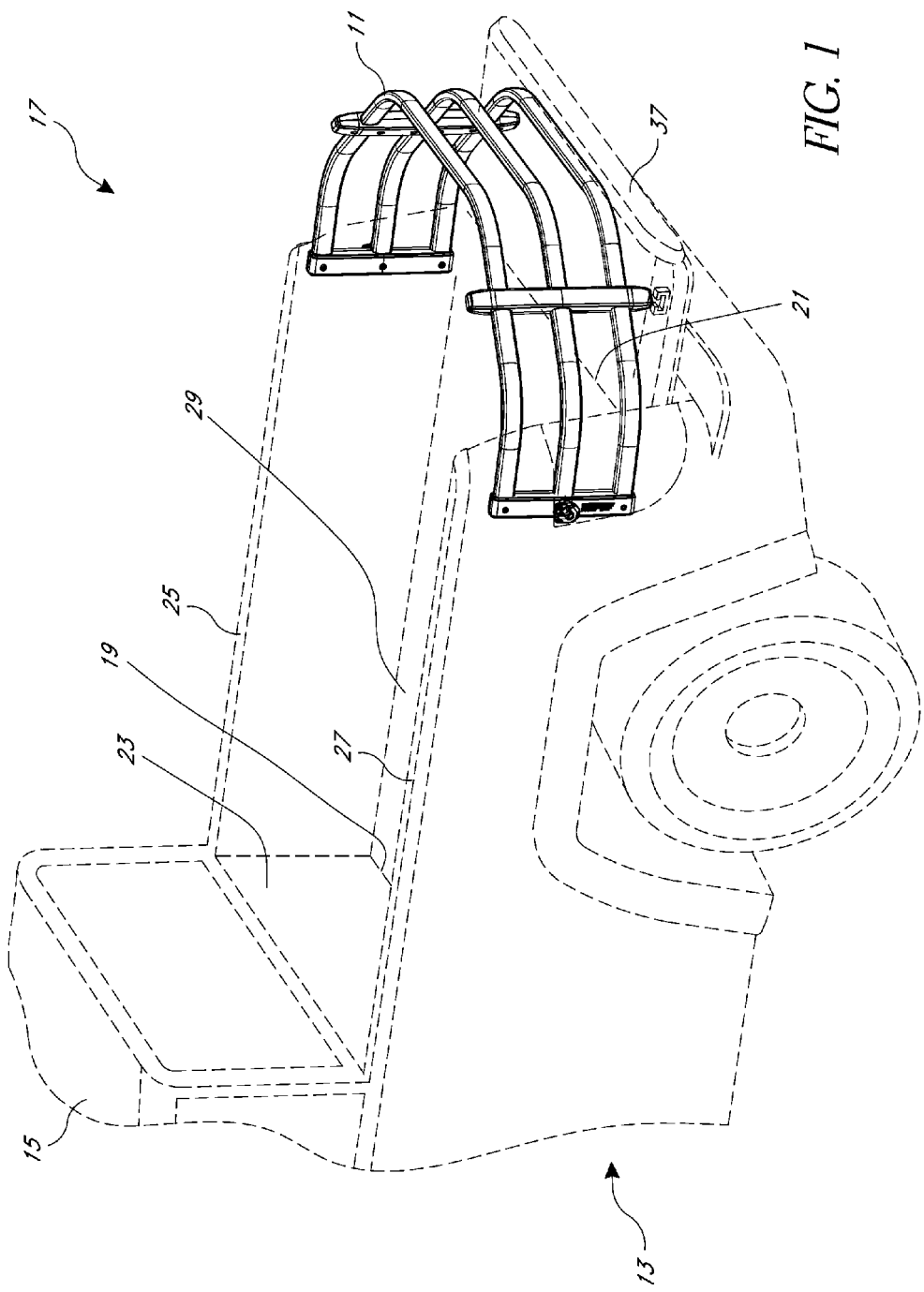

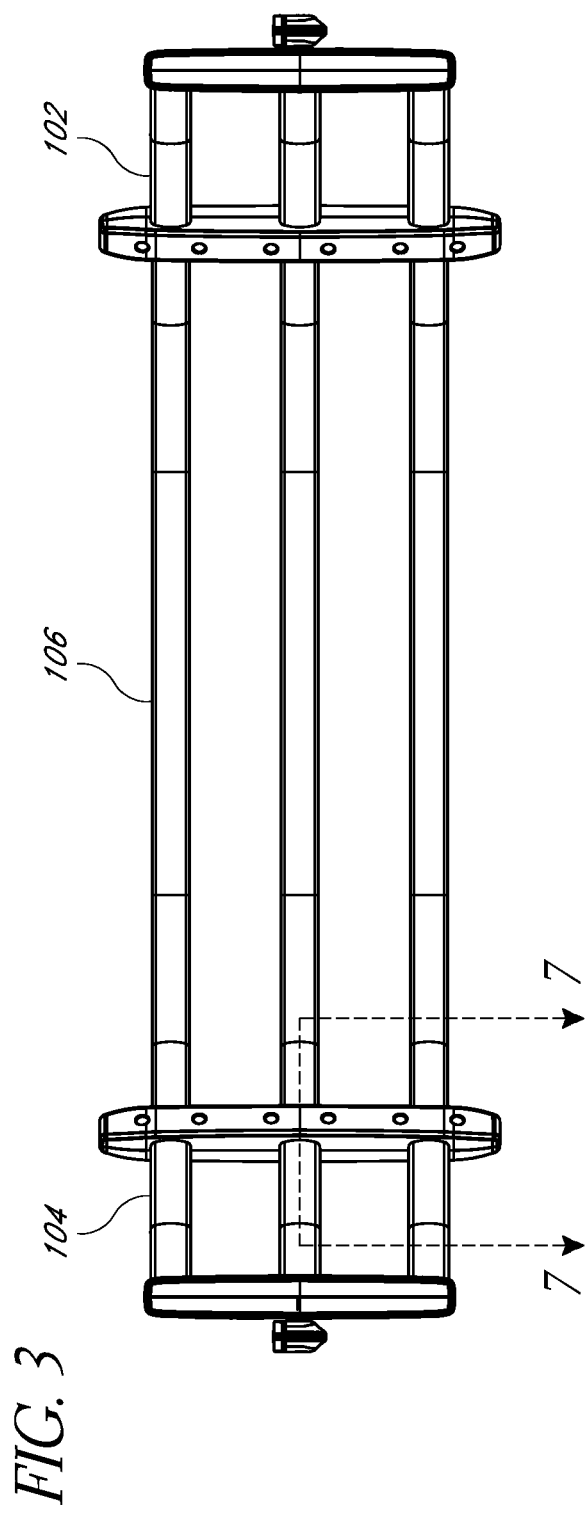

VEHICLE BED EXTENDER

CROSS-REFERENCE TO RELATED APPLICATIONS

Any and all applications for which a foreign or domestic priority claim is identified in the Application Data Sheet as filed with the present application, are hereby incorporated by reference under 37 CFR 1.57. This application is a continuation of U.S. patent application Ser. No. 13/285838, entitled "VEHICLE BED EXTENDER," filed Oct. 31, 2011, which claims priority to U.S. Provisional Patent Application No. 61/503,544, entitled "VEHICLE BED EXTENDER," filed on Jun. 30, 2011, the entirety of each of which is hereby incorporated by reference.

FIELD OF THE DISCLOSURE

The present disclosure generally relates to cargo gates for vehicles, and more particularly to bed extenders for pickup trucks.

BACKGROUND

Pick-up trucks are extremely popular. One of their primary advantages is the ability to haul loads in the storage bed located behind the cab of the vehicle. Unfortunately, often the storage bed is of an undesirable configuration for the load being transported. In particular, it is not unusual for the load to be larger than the truck bed, so that the tailgate of the truck needs to be lowered to enable the load to be adequately transferred. Unfortunately, this raises the risk that the load will fall out of the back of the truck, or that the load will need to be tied down, taking additional time.

For this reason, various vehicle bed extenders have been developed. Despite the great success and excellent functionality of previous bed extenders, new areas exist in which to further improve the vehicle bed extenders.

SUMMARY OF THE DISCLOSURE

A vehicle bed extender is disclosed that can attach to the storage bed of a vehicle having a front end, a rear end, a first side panel, a second side panel, a bottom surface, and a tailgate. The vehicle bed extender comprises a first side wall and a second side wall that are positioned adjacent to the first and second side panels, and a connecting wall that connects the two side walls. The connection between the side walls and the connecting wall can be adjusted so as to simultaneously increase or decrease the length and width of the bed extender. In various embodiments the connecting wall and side walls can be formed of a plurality of cross members, such as tubes, or can be formed in configurations whereby they are substantially solid throughout.

In some embodiments where the connecting wall and side walls are formed of at least two cross members, the cross members of the connecting wall have a middle portion and first and second end portions, the first and second end portions forming an angle with the middle portion. The corners formed by said angles are located closer together for the top cross member than for the bottom cross member such that a portion of the connecting wall formed by the middle portions of the cross members is non-vertically oriented while portions of the connecting wall formed by the first and second end portions of the cross members are generally vertically oriented. Struts that support the bed extender can attach to the end portions of the connecting wall cross members and remain vertically oriented.

In other embodiments the connecting wall of the vehicle bed extender can be supported by at least one mount which is attached to the front end of the vehicle bed. The side walls of the vehicle bed extender extend rearwardly from the connecting wall, or extend rearwardly and upwardly depending on the configuration and positioning of the vehicle bed extender. The side walls can rest on the storage bed, the wheel wells, or other surfaces.

BRIEF DESCRIPTION OF THE DRAWINGS

FIG. 1 is a perspective view of one embodiment of the vehicle bed extender mounted on the storage bed of a truck.

FIG. 3 is a front view of the vehicle bed extender of FIG. 1.

DETAILED DESCRIPTION OF CERTAIN EXEMPLIFYING EMBODIMENTS

Figure 2A:
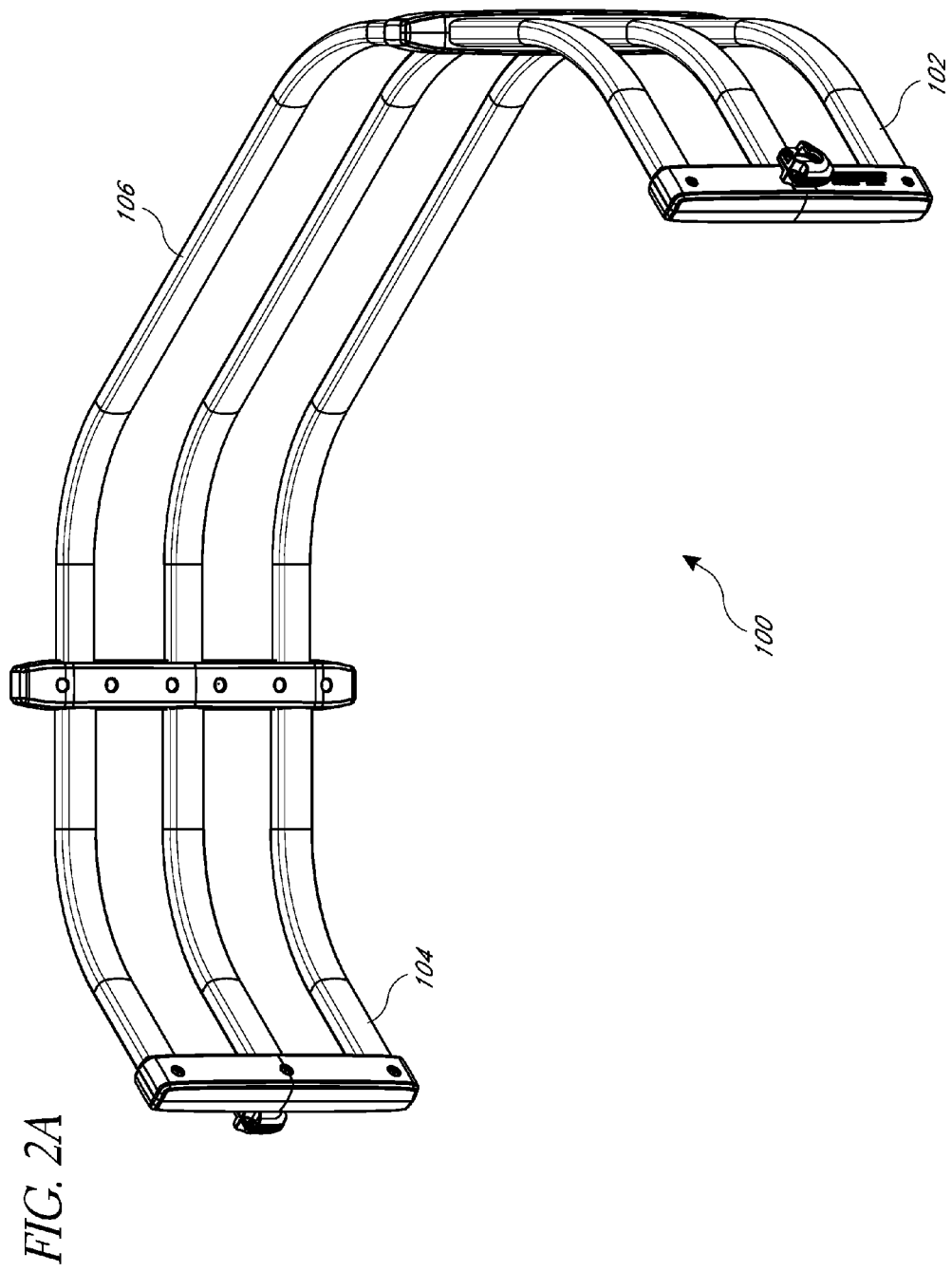
FIG. 2A is a perspective view of the vehicle bed extender of FIG. 1.

A vehicle bed extender can be used to extend the storage area available in a vehicle, such as in a bed of a pick-up truck, for example. Several embodiments of vehicle bed extenders are described herein. With reference to many of the figures, relative directions and positions are used such as top, bottom, front, back, left, and right. With reference to the vehicle bed extender, the direction convention corresponds to a vehicle with the bed extender in the position shown in FIG. 1. That is, the left side of the bed extender corresponds to the left side of the vehicle and the top of the bed extender corresponds to the top of the vehicle all from the orientation of a person sitting in the driver's seat. Similarly, the direction convention for the terms vertical and horizontal correspond to the orientation of the truck, horizontal being along a plane parallel to the bed of the truck, and vertical being substantially perpendicular to that plane. This direction convention is only intended to clarify the description and is in no way intended to limit the scope of the technology, unless otherwise expressly stated.

As illustrated in FIG. 1, a bed extender 11 can be mounted on a truck 13 having a cab 15 to the rear of which is a storage bed 17. The storage bed 17 has a front end 19 and a rear end 21, as well as a bottom surface 29. The front end 19 of the storage bed is defined by a front upstanding panel 23 and the sides of the storage bed are defined by a first side upstanding panel 25 and a second side upstanding panel 27. At the rear end 21 of the storage bed 17 is a tailgate 37.

Figure 2B:
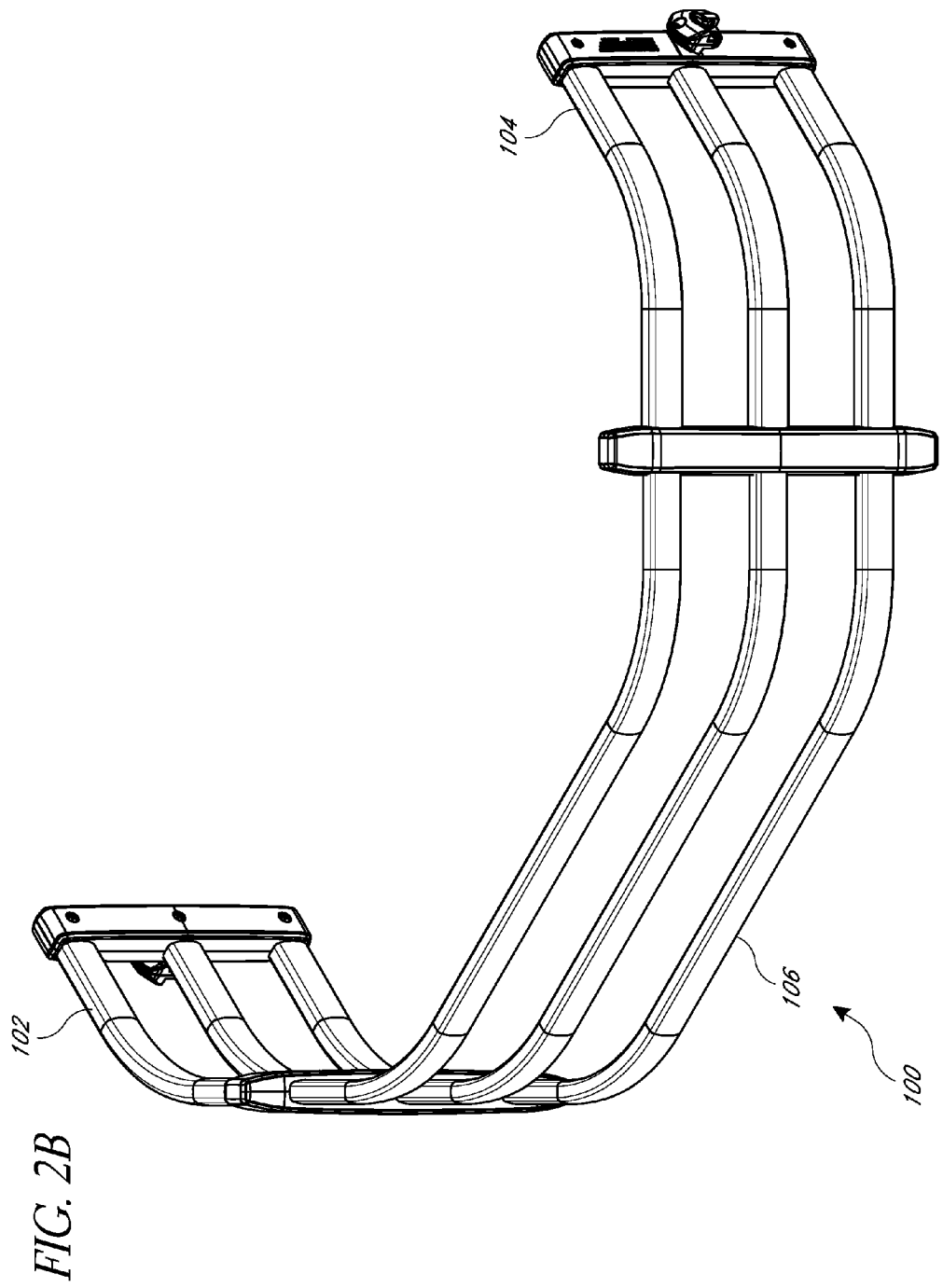
FIG. 2B is a perspective view of the vehicle bed extender of FIG. 1.
Figure 4:
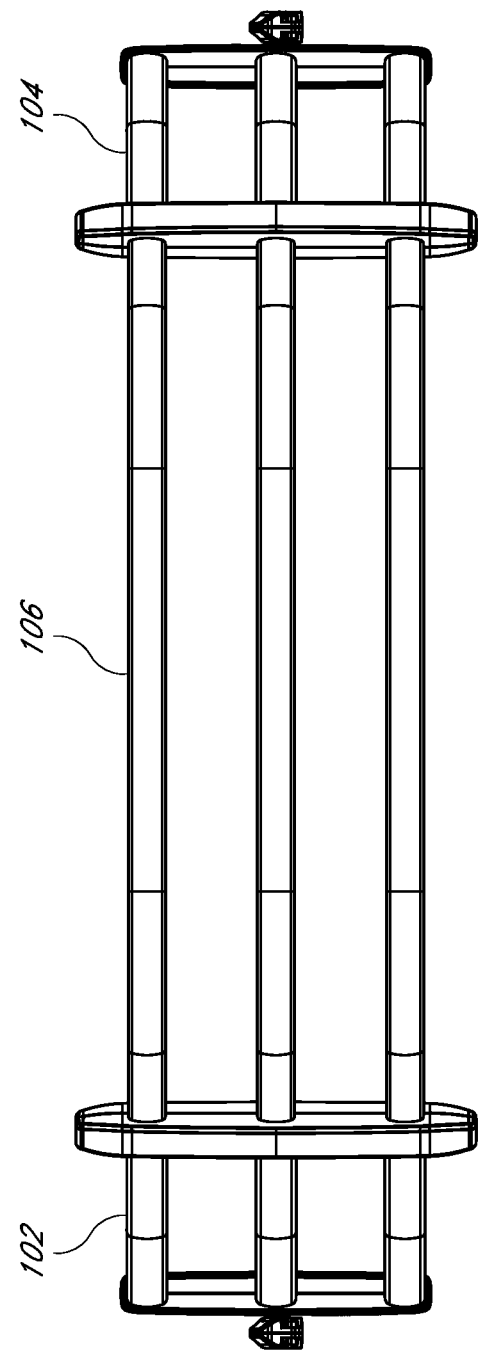
FIG. 4 is a rear view of the vehicle bed extender of FIG. 1.
Figure 5:
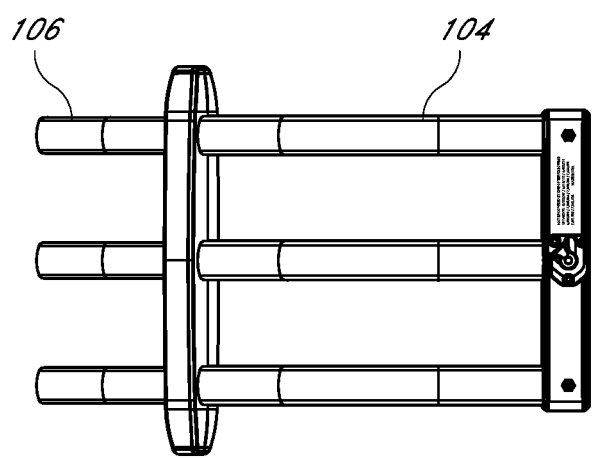
FIG. 5 is a side view of the vehicle bed extender of FIG. 1.
Figure 6:
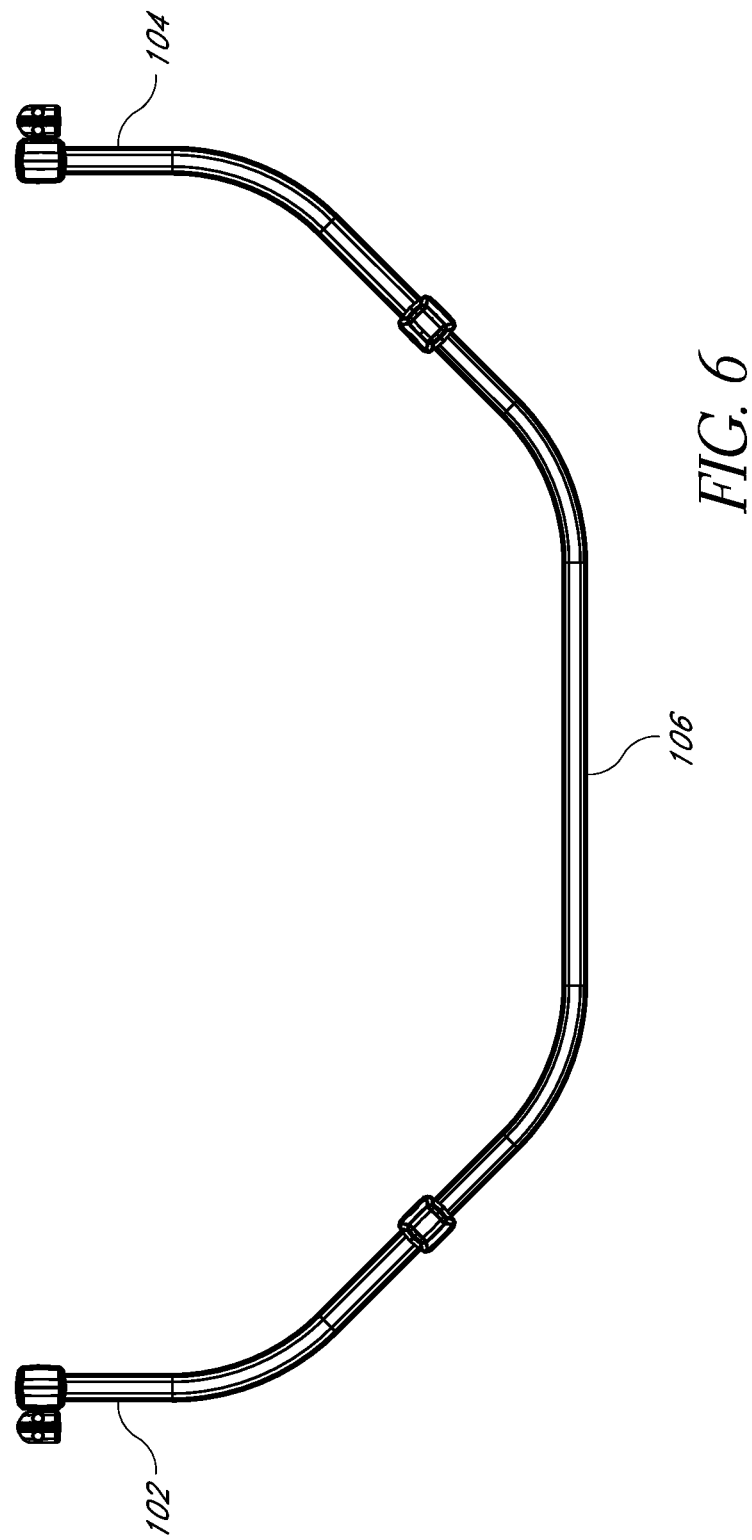
FIG. 6 is a top view of the vehicle bed extender of FIG. 1.

A bed extender 100, shown in FIGS. 2A and 2B, comprises first and second side walls 102, 104, and a connecting wall 106 that connects the side walls 102, 104 such that the bed extender has a general U-shape.

The first and second side walls 102, 104 and the connecting wall 106 can be formed of a plurality of tubes, as shown in FIGS. 2A, 2B, and 3-6 for example. The bed extender may also have embodiments where the first and second side walls 102, 104 and the connecting wall 106 are formed of a plurality of horizontal cross members that have cross-sectional shapes different from those of tubes. In other embodiments, the bed extender can have first and second side walls 102, 104 and a connecting wall 106 that are not formed of horizontal cross members, but of a surface that is solid across all or some of the vertical dimensions of the walls. In some embodiments, the first and second side walls 102, 104 are attached to corresponding sides of the vehicle bed such that the bed extender extends over at least a portion of a tailgate 37 of the vehicle bed, as illustrated in FIG. 1 for example. In other embodiments, the first and second side walls attach to other portions of the storage bed, such as the bottom surface or the tailgate.

Figure 7:
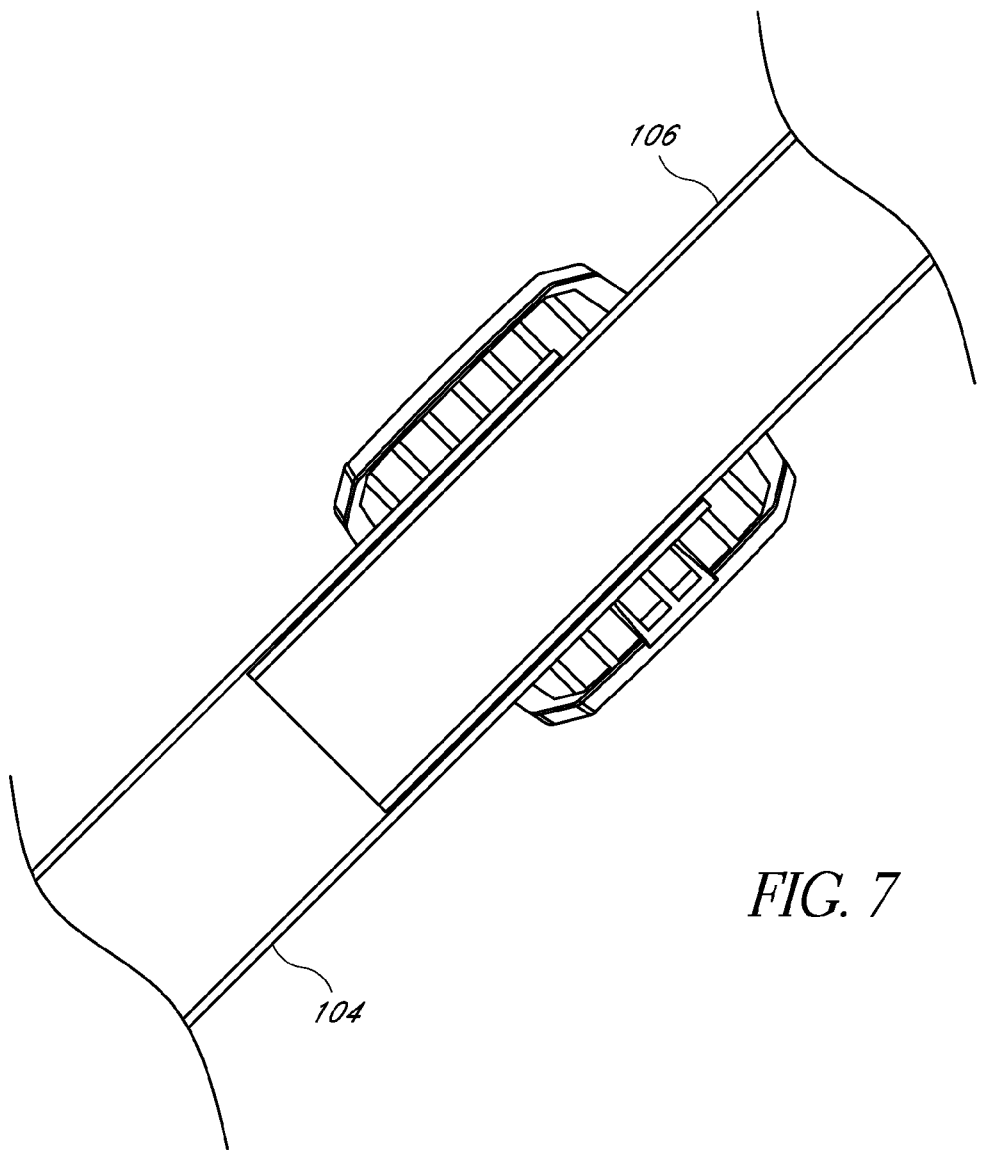
FIG. 7 is a cross-sectional view of the vehicle bed extender of FIG. 1, taken along the line 7-7 of FIG. 3.
Figure 8:
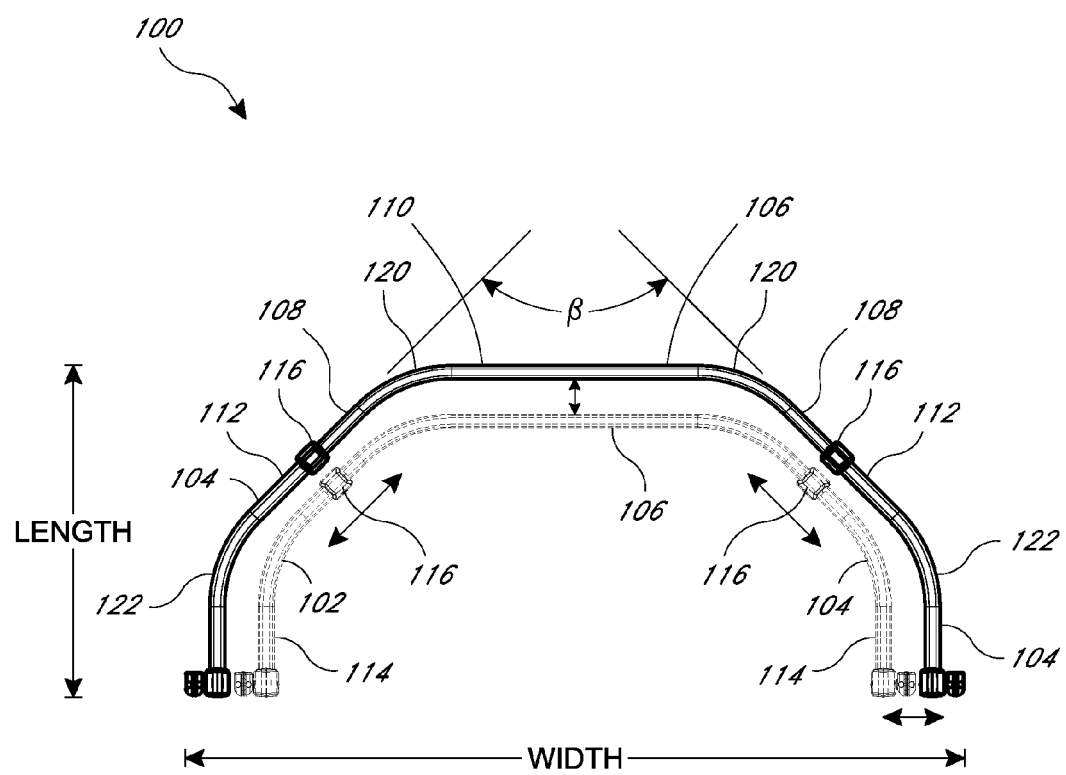
FIG. 8 is a top view illustrating the vehicle bed extender becoming both wider and longer from an initial position (shown in phantom).

The first and second side walls 102, 104 of the bed extender 100 are connected with the connecting wall 106 in a telescoping arrangement, as illustrated in FIG. 8. For example, in embodiments where the side walls and connecting wall comprise a plurality of generally horizontally-oriented tubes, the tubes of the side walls can be slightly larger than the tubes of the connecting wall, such that the connecting wall tubes can be inserted into the side wall tubes, as illustrated in FIG. 7. In some embodiments where the side walls and connecting wall comprise a plurality of generally horizontally-oriented tubes, the tubes of the side walls can be slightly smaller than the tubes of the connecting wall, such that the side wall tubes can be inserted into the connecting wall tubes. The tubes may also have a detent or other mechanism that restricts movement of the connecting wall tube relative to the side wall tubes.

As illustrated in the embodiment of FIG. 8, the end portions 108 of each tube of the connecting wall form an angle with a middle portion 110 of the connecting wall tube 106 at bends 120. The total bend angle ($\beta$) between the bend ends of the connecting wall tubes is greater than 0° and less than 180°, and preferably greater than 45° and less than 135°. In some embodiments, the total bend angle is greater than approximately 5° and less than approximately 175°, is greater than approximately 10° and less than approximately 170°, is greater than approximately 15° and less than approximately 165°, is greater than approximately 20° and less than approximately 160°, is greater than approximately 25° and less than approximately 155°, is greater than approximately 30° and less than approximately 150°, is greater than approximately 35° and less than approximately 145°, is greater than approximately 40° and less than approximately 140°, is greater than approximately 45° and less than approximately 135°, is greater than approximately 50° and less than approximately 130°, is greater than approximately 55° and less than approximately 125°, is greater than approximately 60° and less than approximately 120°, is greater than approximately 65° and less than approximately 115°, is greater than approximately 70° and less than approximately 110°, is greater than approximately 75° and less than approximately 105°, is greater than approximately 80° and less than approximately 100°, or is greater than approximately 85° and less than approximately 95°. In some embodiments, the total bend angle is between approximately 10° and approximately 30°, approximately 20° and approximately 40°, approximately 30° and approximately 50°, approximately 40° and approximately 60°, approximately 50° and approximately 70°, approximately 60° and approximately 80°, approximately 70° and approximately 90°, approximately 80° and approximately 100°, approximately 90° and approximately 110°, approximately 100° and approximately 120°, approximately 110° and approximately 130°, approximately 120° and approximately 140°, approximately 130° and approximately 150°, approximately 140° and approximately 160°, or approximately 150° and approximately 170°. In some embodiments, the total bend angle is between approximately 10° and approximately 55°, approximately 20° and approximately 65°, approximately 30° and approximately 75°, approximately 40° and approximately 85°, approximately 50° and approximately 95°, approximately 60° and approximately 105°, approximately 70° and approximately 115°, approximately 80° and approximately 125°, approximately 90° and approximately 135°, approximately 100° and approximately 145°, approximately 110° and approximately 155°, approximately 120° and approximately 165°, or approximately 130° and approximately 175°. In some embodiments, the total bend angle is approximately 45°, 50°, 55°, 60°, 65°, 70°, 75°, 80°, 85°, 90°, 95°, 100°, 105°, 110°, 115°, 120°, 125°, 130°, or 135°.

In some embodiments, the tubes forming the side walls 102, 104 have bends 122 such that portions 112 which connect to the connecting wall 106 are generally linearly aligned with the end portions 108 of the connecting wall tubes while portions 114 of the side wall tubes are oriented generally along a length of the vehicle bed and connected to the vehicle bed. In other embodiments the tubes forming the side walls 102, 104 do not have bends and are generally linearly aligned with the end portions 108 of the connecting wall tubes, but connect to the vehicle bed in a position that is not generally along a length of the vehicle bed. In other embodiments the connecting wall 106 is curved, but the end portions 108 of the connecting wall are generally aligned with the portions 112 of the side walls which connect to the connecting wall. Additionally or alternatively, the side walls 102, 104 may comprise multiple connectable segments, but the two segment pairs that connect in a telescoping arrangement in such embodiments connect along lines substantially nonparallel to the length and width of the bed extender, and form an angle ($\beta$) within the above-described ranges. The width of the bed extender can be defined by a distance between the outer edge of the first end and the second end of the bed extender. In the illustrated embodiment in FIG. 8, the outer edge of both the first end and the second end is defined by the outer surface of the mount or connecting apparatus 126, which is used to attach the bed extender to the panel of the vehicle.

With the side walls 102, 104 and the connecting wall 106 adjustable in a direction that is not parallel to either its width or length (or the width or length of the vehicle bed), the width and the length of the bed extender can be varied simultaneously. When the side wall tubes and the connecting wall tubes are moved relative to each other in a telescoping manner, the bed extender becomes both wider and longer, or both narrower and shorter. In some embodiments, vehicle bed extenders can have walls which are not formed of tubes, but nonetheless telescope along portions that are angled with respect to the length and wide of the bed extender.

Figure 9:
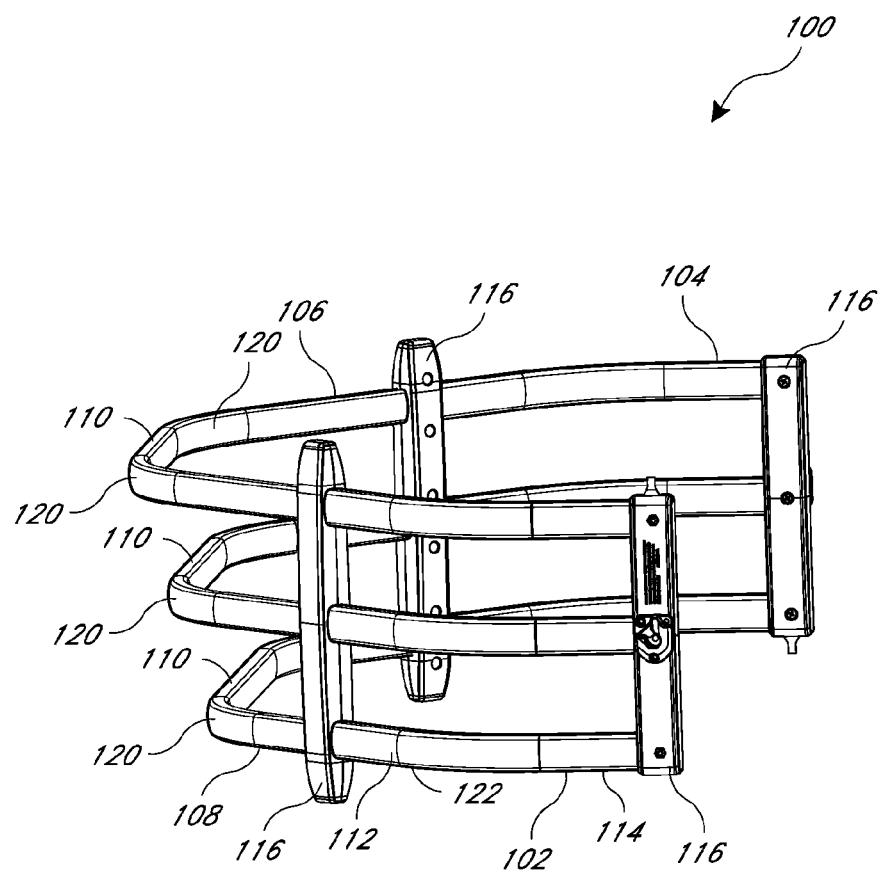
FIG. 9 is a perspective view of one embodiment of the vehicle bed extender where a portion of the connecting wall is not vertical.
Figures 11, 12:
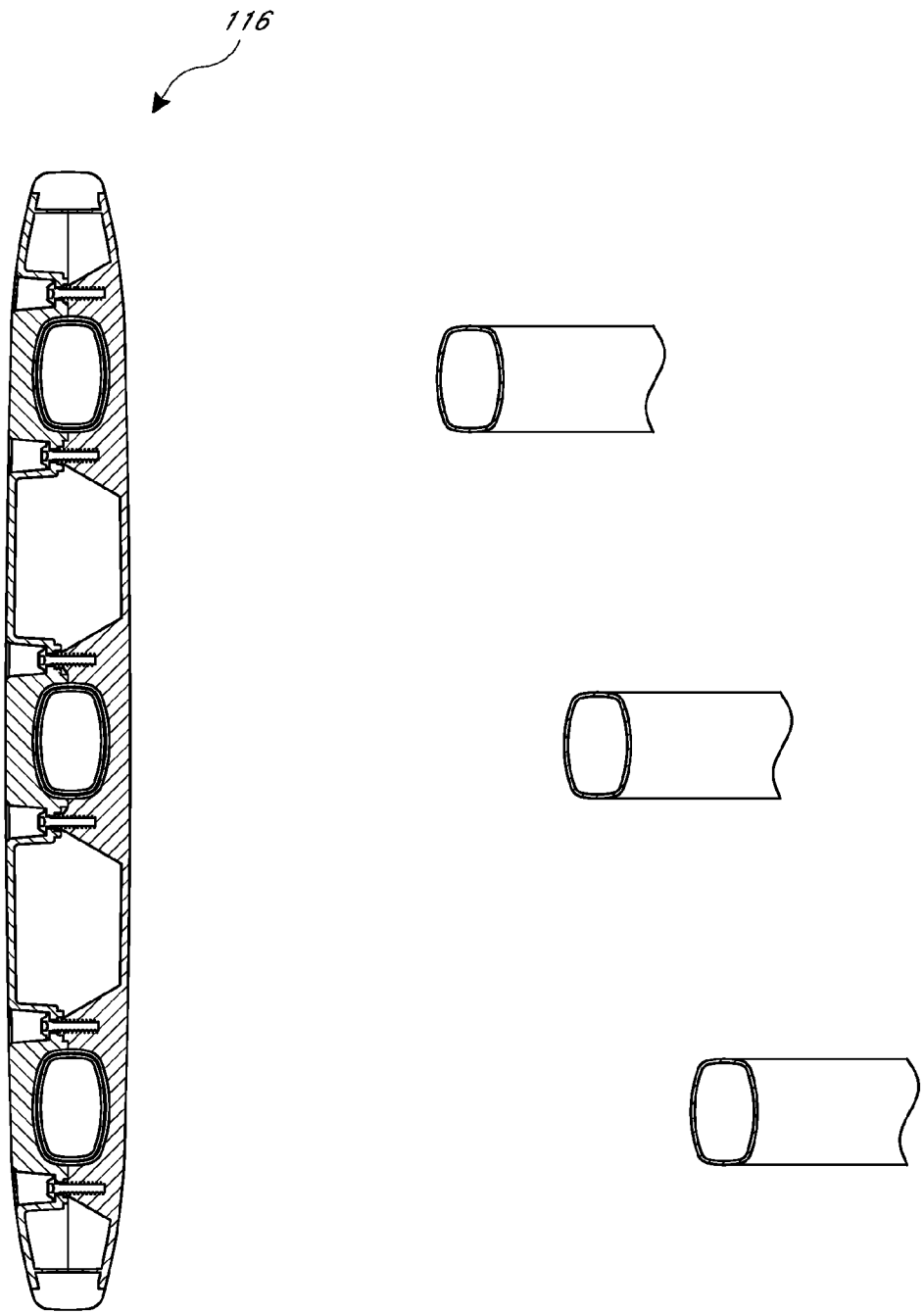
FIG. 11 is a cross-sectional view of a strut.
FIG. 12 is a cross-sectional view of the tubes of one embodiment of the vehicle extender.

The bed extender 100 as illustrated in FIG. 8 comprises a plurality of struts 116. The bed extender can have struts 116 located at or near locations of the side walls of the bed extender where the bed extender connects to the vehicle bed. The bed extender can also have struts located between the connections to the vehicle bed. For example, as illustrated in FIG. 8, the bed extender 100 can comprise a strut positioned between the bends 120 in the connecting wall and bends 122 in the side walls. Some embodiments can employ more or fewer struts than illustrated in FIG. 8. In embodiments with a strut positioned between the bends 120 in the connecting wall and bends 122 in the side walls, the strut can be connected directly to the outer tube in a telescoping arrangement as illustrated in FIG. 7, or to the inner tube in the telescoping arrangement.

Where the side walls and connecting wall are formed of tubes or other cross members, preferably at least some of the struts hold the tubes in a desired configuration, as illustrated in FIG. 9 for example. The tubes can have a cross-section having a height and a width, with the height being of a greater dimension than the width, as illustrated in FIGS. 11-12. As illustrated in FIG. 11, the struts 116 can hold all of the tubes in a vertical orientation. For example, a major axis of symmetry in the cross section of a tube can be oriented to be vertical or substantially vertical when in a use configuration of the bed extender. As illustrated in FIG. 12, the middle portions 110 of the connecting member tubes can be vertically oriented when the bed extender is in a use configuration.

Figure 10:
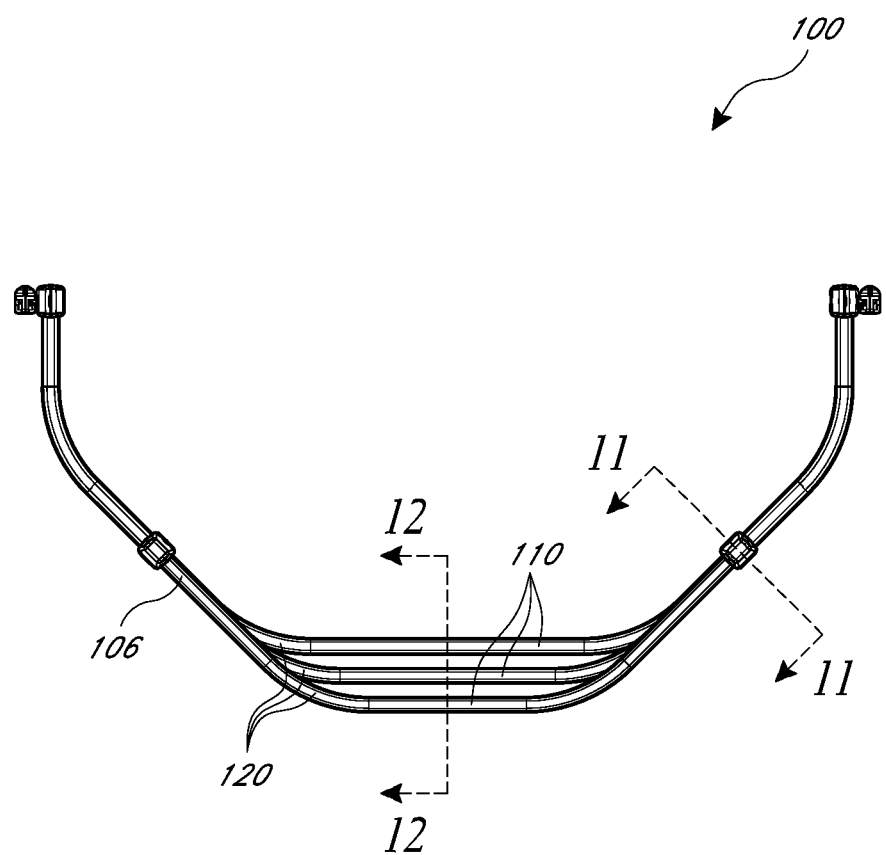
FIG. 10 is a top view of the vehicle bed extender of FIG. 9.

As illustrated in FIGS. 8-10, all of the struts 116 of the bed extender 100 can be vertically oriented. As illustrated in FIG. 11, the struts 116 can hold the tubes such that a major axis of symmetry in the cross section of the tubes can be oriented to be parallel or substantially parallel to a major dimension of the strut. As illustrated in FIGS. 8 and 9, the struts 116 at corresponding locations on opposite sides of a plane bisecting the bed extender can be identical or substantially identical. Some, all or none of the struts can be configured to rest against the tailgate to support the bed extender. As illustrated in FIG. 9, the struts can have members configured for contact with support surfaces at the ends of the struts 116 in some embodiments.

The locations of bends 120 of each connecting wall tube between the end portions 108 and the middle portion 110 can be varied among the tubes that form the connecting wall. For example, as illustrated in FIGS. 9 and 10, if the locations of bends 120 are closer to a center of the connecting wall 106 at or near a top of the connecting wall than they are at a bottom the top of the connecting wall, the connecting wall 106 has a non-vertical middle portion 110 with the top of the connecting wall being farther from the end supports than the bottom of the connecting wall. This arrangement allows the struts 116 to be vertically oriented even though the middle portion 110 of the connecting wall 106 is not vertically oriented, as illustrated in FIG. 9.

Figure 15:
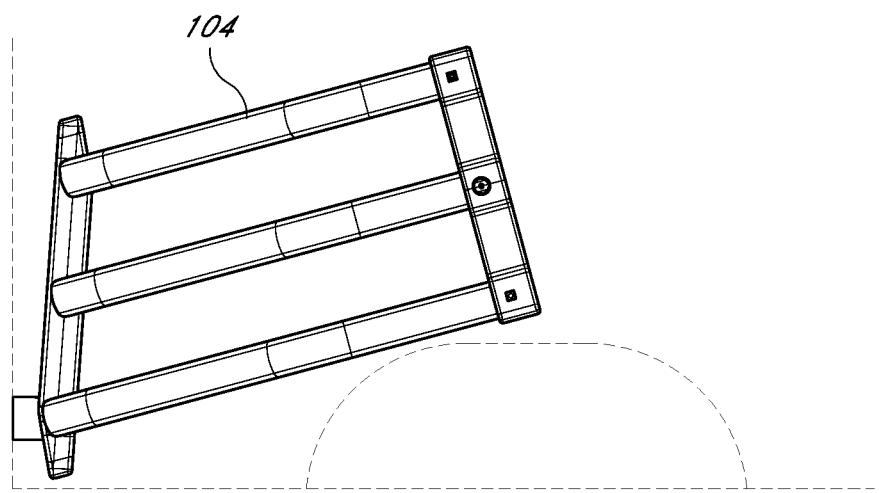
FIG. 15 is a side view of one embodiment of the vehicle bed extender mounted to the front of the vehicle bed.
Figure 16:
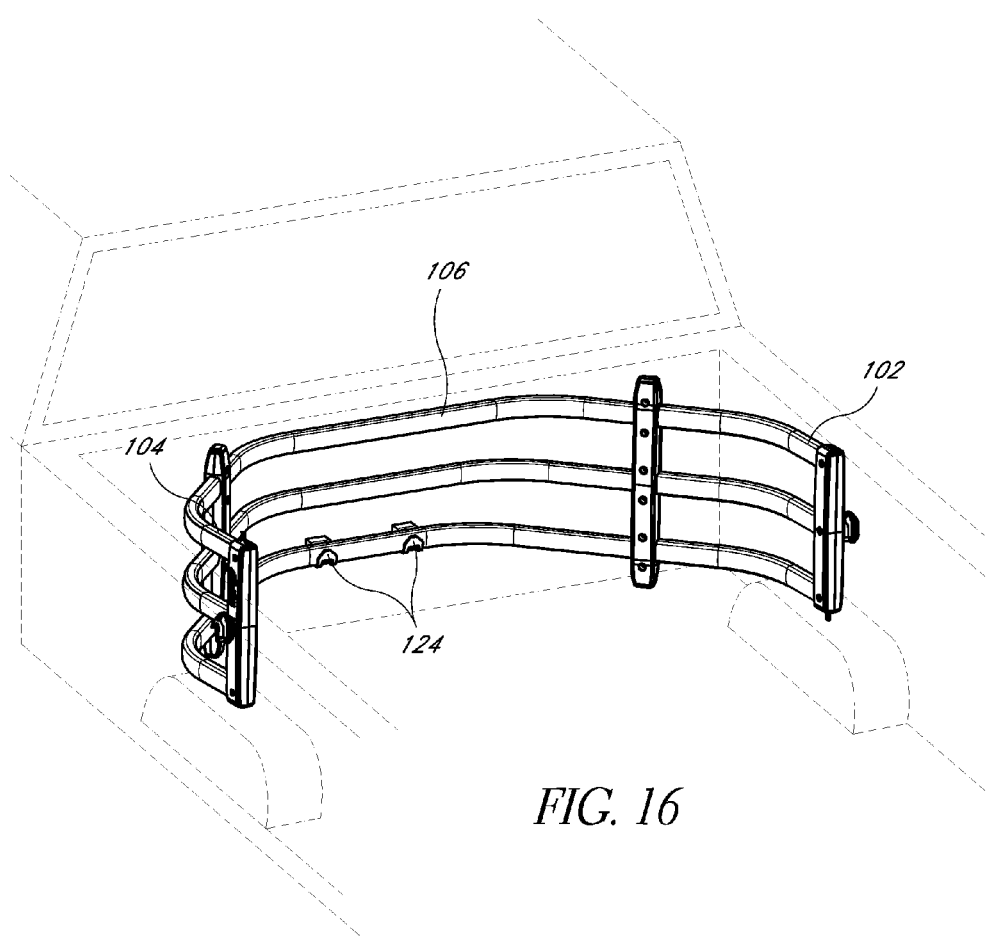
FIG. 16 is a perspective view of one embodiment of the vehicle bed extender mounted to the front of the vehicle bed.
Figure 17:
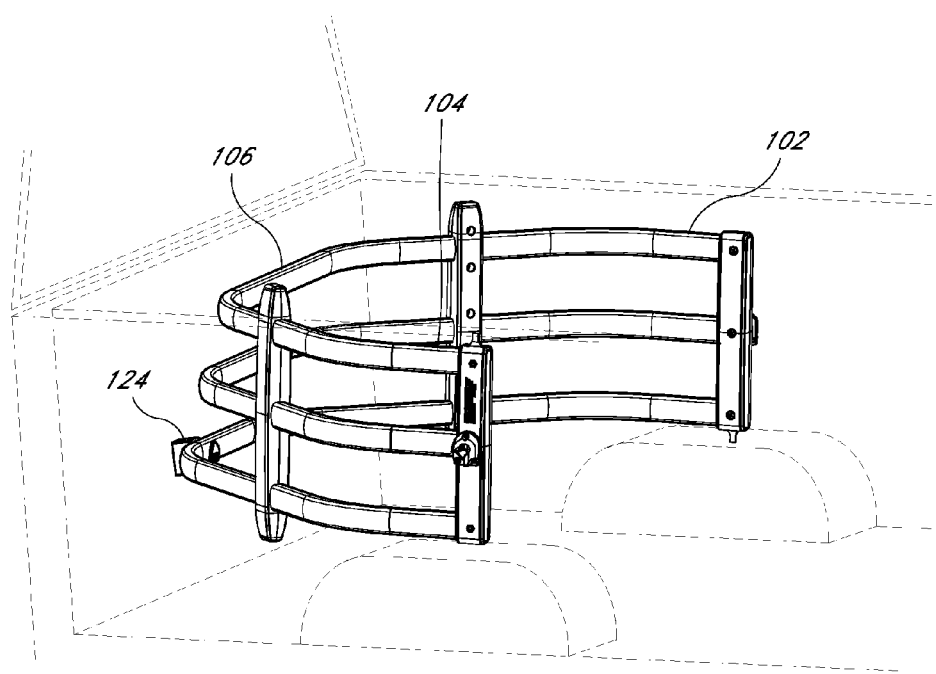
FIG. 17 is a side perspective view of one embodiment of the vehicle bed extender mounted to the front of the vehicle bed.
Figure 18:
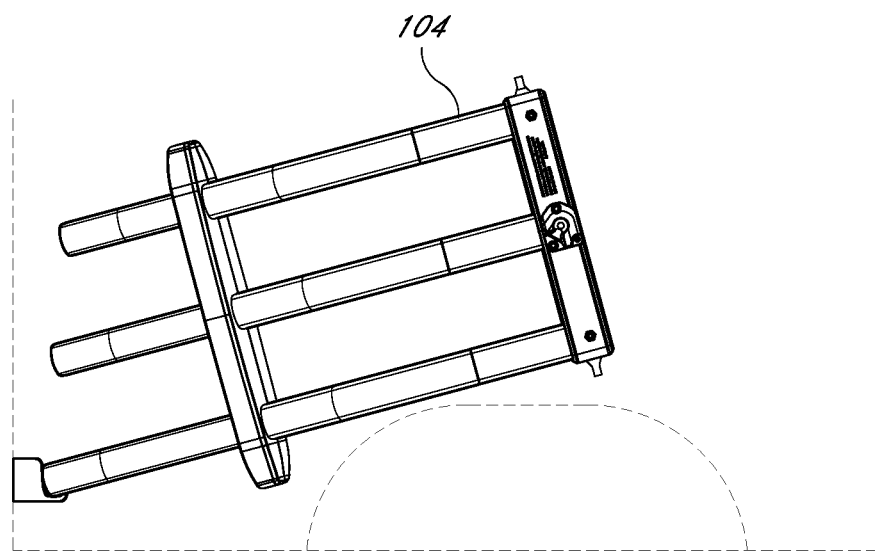
FIG. 18 is a side view of another embodiment of the vehicle bed extender mounted to the front of the vehicle bed.

FIGS. 13-18 illustrate an alternative location and orientation for attachment of a bed extender 100 to a vehicle bed. As illustrated in FIGS. 13-18, the bed extender 100 can be attached to a vehicle bed with the connecting wall 106 generally adjacent to a front of the bed, such as behind the cab of the truck for example, with the side walls 102, 104 extending rearwardly from the connecting wall 106. In embodiments where the connecting wall 106 has a non-vertical middle portion, the connecting wall 106 can attach to the front of the bed in such a position that the side walls 102, 104 extend rearwardly and upwardly, as illustrated in FIGS. 15 and 18. Further, as shown in FIGS. 15 and 18, the bed extender 100 can be reversibly rotated greater than 180° between a usage position where the bottom edge is closer to the bottom surface of the storage bed than the top edge, and a storage position where the top edge is closer to the bottom surface of the storage bed than the bottom edge. Further, as shown, in the storage position the to edge is closer to the front end of the storage bed than the bottom edge. Moreover the to edge can be closer to the bottom of the storage bed in the storage position than the bottom edge is to the bottom of the storage bed in the usage position.

Figure 13:
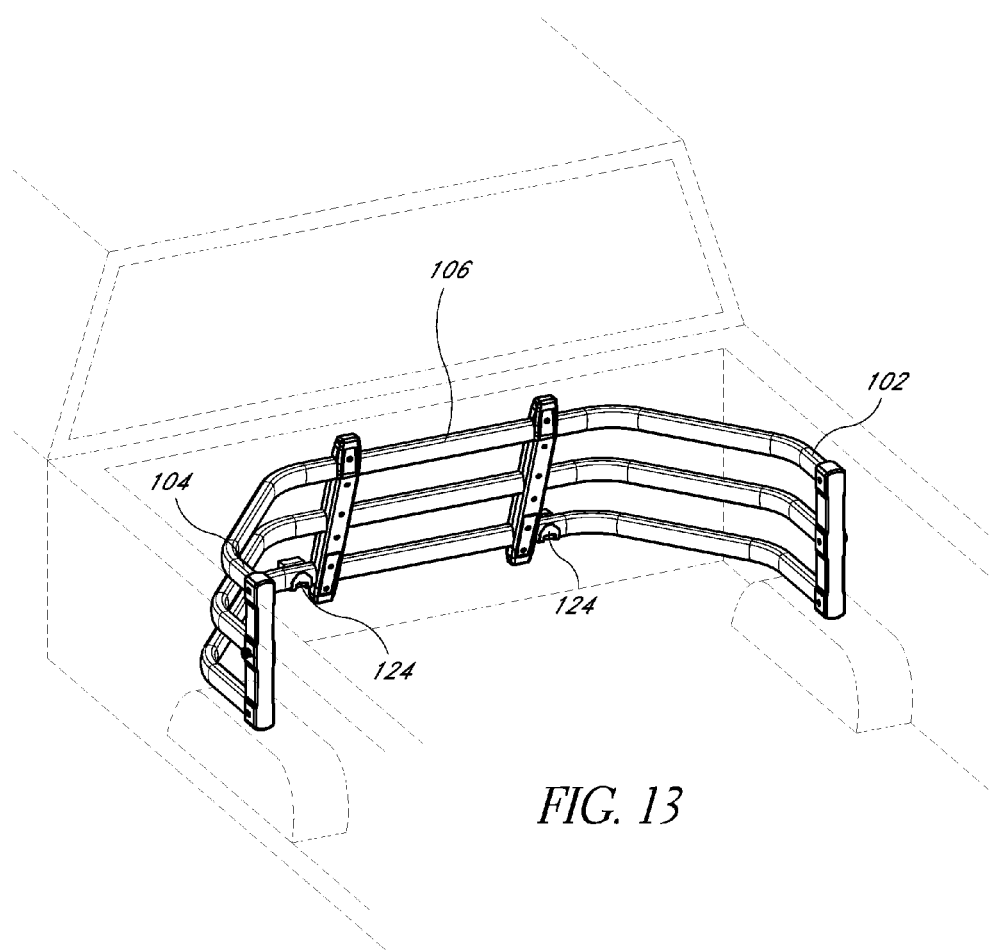
FIG. 13 is a perspective view of one embodiment of the vehicle bed extender mounted to the front of the vehicle bed.
Figure 14:
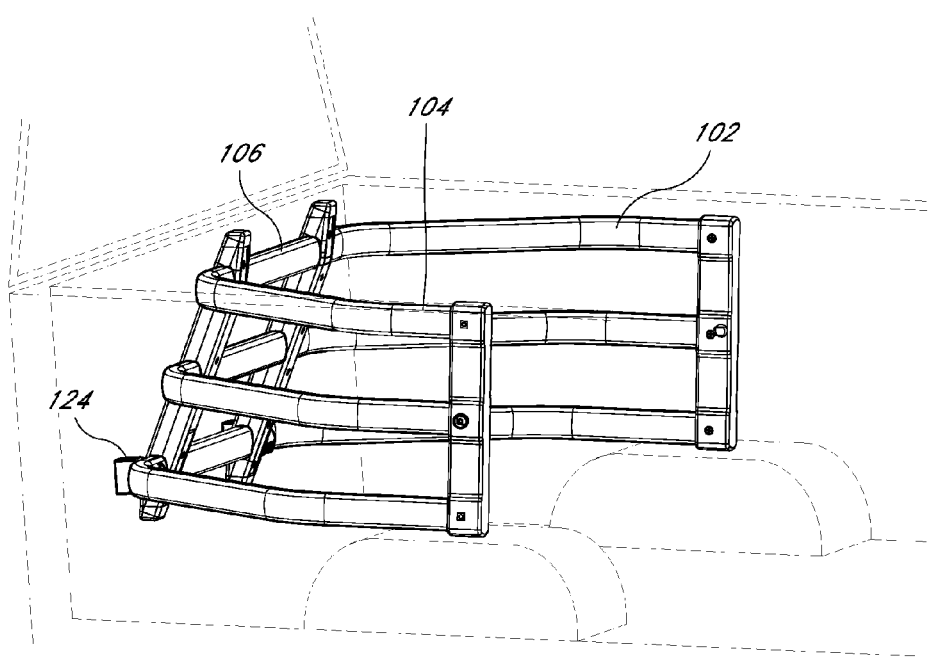
FIG. 14 is a side perspective view of one embodiment of the vehicle bed extender mounted to the front of the vehicle bed.

As illustrated in FIGS. 13-18, one or more mounts 124 are connected to the vehicle bed to hold and support the bed extender in some embodiments. For example, as illustrated in FIG. 13, a pair of mounts 124 can be attached to a front wall of the bed to receive and support the connecting wall 106 of the bed extender 100. The mounts 124 can be installed a height above a floor of the bed that accommodates any necessary or desired clearances, such as for wheel wells, etc. The side walls 102, 104 of the bed extender 100 can rest on a floor of the bed or, if present and properly located, wheel wells, as illustrated by FIGS. 13-18. The mounts 124 can also be installed at various positions relative to the width of the truck.

Figure 19:
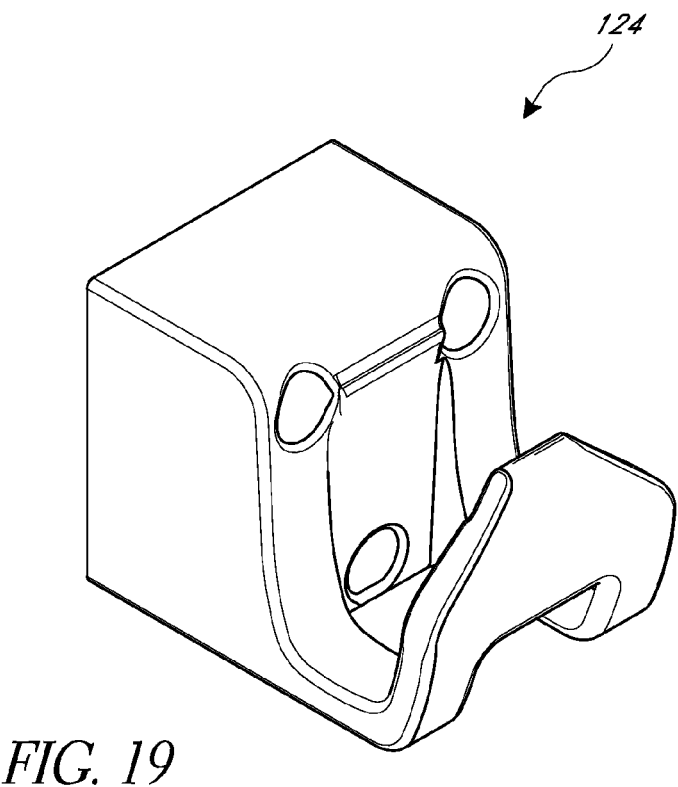
FIG. 19 is a perspective view of one embodiment of a mount.
Figure 20:
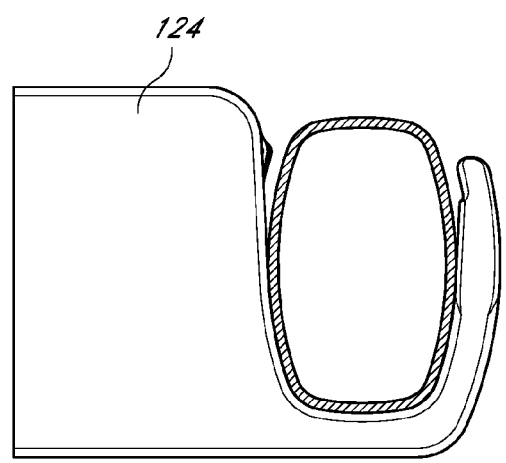
FIG. 20 is a side view of the mount of FIG. 19 and a cross-sectional view of a tube of one embodiment of the vehicle bed extender.
Figure 21:
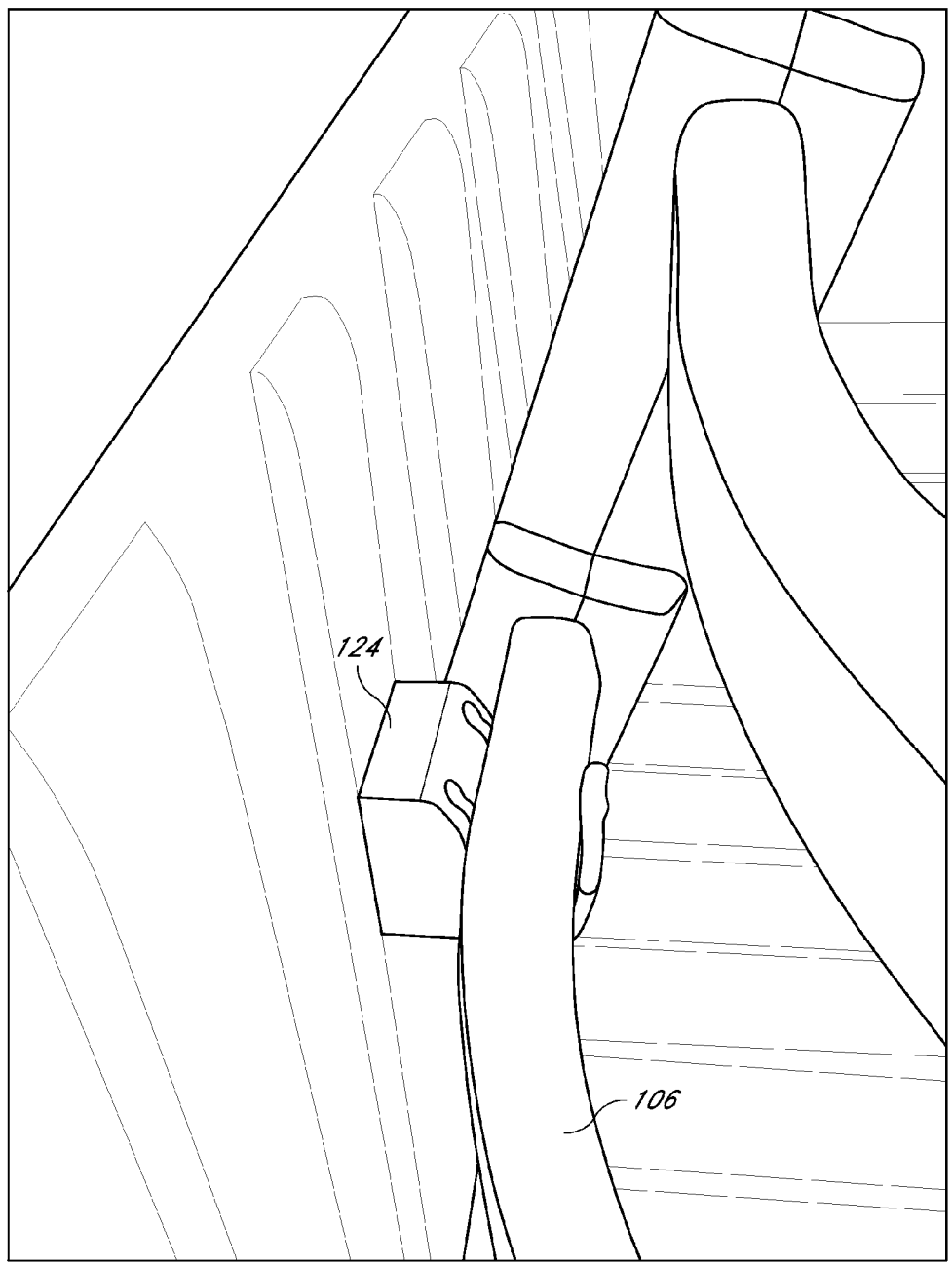
FIG. 21 is a perspective view of the vehicle bed extender mounted to the front of the vehicle bed.
Figure 22:
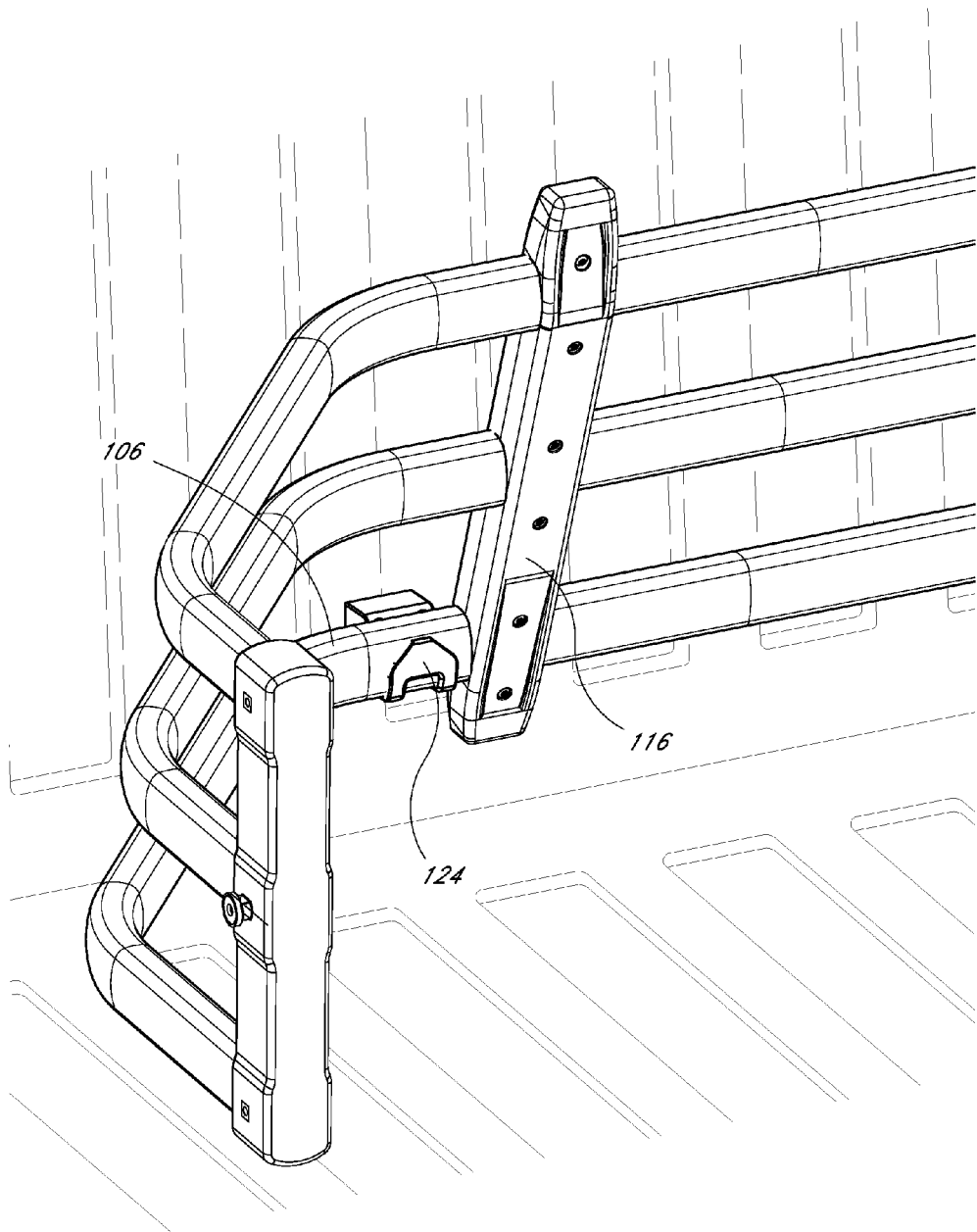
FIG. 22 is a perspective view of the vehicle bed extender of FIG. 21.

As illustrated in FIGS. 19 and 20, the mounts 124 can be generally hook shaped. They are configured to receive at least a portion of one of the walls of the bed extender, as illustrated for example in FIGS. 21 and 22. In embodiments where the walls of the bed extender comprise tubes, the mount 124 can be configured to receive a portion of one of the tubes, as illustrated in FIGS. 21 and 22 for example. Preferably, the mounts 124 are configured to flex slightly as corresponding tube portions are moved into the mounts 124, then return toward their original shape such that the corresponding tube portions are retained by the mounts. In other embodiments, the shape of the mounts 124 may vary to correspond to the shape of the walls of the bed extender and to be able to successfully receive and support said walls.

Further details regarding the bed extenders, their manufacture, and use are provided in U.S. Pat. No. 6,402,215, entitled "VEHICLE CARGO BED EXTENDER" and issued Jun. 11, 2002, U.S. Pat. No. 7,240,940, entitled "VEHICLE CARGO BED EXTENDER" and issued Jul. 10, 2007, U.S. Pat. No. 7,841,638, entitled "VEHICLE CARGO TAILGATE ENCLOSURE" and issued Nov. 30, 2010, and U.S. Pat. No. 7,959,203, entitled "VEHICLE TAILGATE ENCLOSURE WITH ENHANCED ADJUSTMENT" and issued Jun. 14, 2011, all which are incorporated by reference herein in their entireties, are included in the attached appendix, and form a portion of this specification.

What is claimed is:
1. A vehicle bed extender assembly comprising:
a vehicle having a storage bed having a front end, a rear end, a first upstanding side panel defining one side of said bed, a second upstanding side panel defining an opposite side of said bed, a bottom surface, and a tailgate at a rear end;

a vehicle bed extender comprising:
- a first side wall configured to be positioned adjacent the first side panel of the storage bed, the first side wall having a first end;
- a second side wall configured to be positioned adjacent the second side panel of the storage bed, the second side wall having a second end;
- a connecting wall which connects said first side wall and said second side wall, the connecting wall having a top and a bottom edge;
- wherein the first and second side walls are adjustably connected to the connecting wall; and
- wherein the vehicle bed extender is configured to be reversibly rotated greater than 180° between a usage position where the bottom edge is closer to the bottom surface of the storage bed than the top edge, and a storage position where the top edge is closer to the bottom surface of the storage bed and the front end of the storage bed than the bottom edge; and
- at least one mount configured to be attached to the front end of the storage bed, the at least one mount configured to retain the vehicle bed extender in the storage position.

2. The assembly of claim 1, wherein said side walls comprise multiple beams and each beam comprises a single integral tube.

3. The assembly of claim 1, wherein the first side wall is attached to the first side panel and the second side wall is attached to the second side panel at a first and second attachment point.

4. The assembly of claim 1, wherein the connecting wall and the first and second side walls are connected in a sliding configuration with the direction of sliding movement being nonparallel to both the length and width of the bed extender.

5. The assembly of claim 4, wherein at least one of the connecting wall and the side walls comprise a plurality of cross members and said cross members are slidingly receivable in the other of the connecting wall and the side walls.

6. A vehicle bed extender and mount assembly for use with a vehicle having a storage bed having a front end, a rear end, a first upstanding side panel defining one side of said bed, a second upstanding side panel defining an opposite side of said bed, a bottom surface, and a tailgate at a rear end said assembly comprising:
  a vehicle bed extender comprising:
  - a first side wall configured to be positioned adjacent the first side panel of the storage bed, the first side wall having a first end;
  - a second side wall configured to be positioned adjacent the first side panel of the storage bed, the second side wall having a second end; and
  - a connecting wall which connects said first side wall and said second side wall, the connecting wall having a top and a bottom edge;
  - wherein the first and second side walls are adjustably connected to the connecting wall; and
  - wherein the vehicle bed extender is configured to be reversibly rotated greater than 180° between a usage position where the bottom edge is closer to the bottom surface of the storage bed than the top edge, and a storage position where the top edge is closer to the bottom surface of the storage bed and the front end of the storage bed than the bottom edge; and
  - at least one mount configured to be attached to the front end of the storage bed, the at least one mount configured to retain the vehicle bed extender in the storage position.

7. The assembly of claim 6, wherein said side walls comprise multiple beams and each beam comprises a single integral tube.

8. The assembly of claim 6, wherein the first side wall is attached to the first side panel and the second side wall is attached to the second side panel at a first and second attachment point.

9. The assembly of claim 3, wherein the vehicle bed extender is configured to rotate on an axis of the attachment points.

10. The assembly of claim 1, wherein the top edge is closer to the bottom of the storage bed in the storage position than the bottom edge is to the bottom of the storage bed in the usage position.

11. The assembly of claim 6, wherein the top edge is closer to the bottom of the storage bed in the storage position than the bottom edge is to the bottom of the storage bed in the usage position.

12. A vehicle bed extender assembly for use with a vehicle having a storage bed having a front end, a rear end, a first upstanding side panel defining one side of said bed, a second upstanding side panel defining an opposite side of said bed, a bottom surface, and a tailgate at a rear end, said vehicle bed extender assembly comprising:
  - a first side wall configured to be positioned adjacent the first side panel of the storage bed, the first side wall having a first end;
  - a second side wall configured to be positioned adjacent the first side panel of the storage bed, the second side wall having a second end; and
  - a connecting wall which connects said first side wall and said second side wall, the connecting wall having a top and a bottom edge;
  - wherein the first and second side walls are adjustably connected to the connecting wall; and
  - wherein the vehicle bed extender is configured to be reversibly rotated greater than 180° between a usage position where the bottom edge is closer to the bottom surface of the storage bed than the top edge, and a storage position where the top edge is closer to the bottom surface of the storage bed and the front end of the storage bed than the bottom edge.

13. The assembly of claim 12, wherein the top edge is closer to the bottom of the storage bed in the storage position than the bottom edge is to the bottom of the storage bed in the usage position.

* * * * *